United States Patent [19]

Welch

[11] 3,777,360

[45] Dec. 11, 1973

[54] FRICTION WELDING PROCESS

[75] Inventor: Eugene E. Welch, Indianapolis, Ind.

[73] Assignee: General Motors Corporation, Detroit, Mich.

[22] Filed: Feb. 23, 1972

[21] Appl. No.: 228,705

[52] U.S. Cl. ................................. 29/470.3, 228/2
[51] Int. Cl. ........................................... B23k 27/00
[58] Field of Search .................... 228/2; 29/470.3; 156/73

[56] References Cited
UNITED STATES PATENTS

| 3,338,775 | 8/1967 | Dawn et al. ........................ 228/2 X |
| 3,429,591 | 2/1969 | Layd et al. ....................... 29/470.3 X |
| 3,485,143 | 12/1969 | Canady ........................... 29/470.3 X |

Primary Examiner—J. Spencer Overholser
Assistant Examiner—Robert J. Craig
Attorney—W. E. Finken et al.

[57] ABSTRACT

Friction welding process in which metallic workpieces are welded at end and side interface zones with substantially all flash squeezed radially inwardly into an opening in one of the workpieces at the axis of rotation.

4 Claims, 4 Drawing Figures

PATENTED DEC 11 1973　　3,777,360

FRICTION WELDING PROCESS

This invention relates to friction welding and more particularly to a new and improved process of frictionally welding metal workpieces together at end and side interface zones.

Prior to the present invention many different friction welding processes and techniques have been employed to frictionally weld metal rods and tubes to metallic workpieces such as a plate. With most of these prior art processes, the workpieces were joined only at a single engaged interface zone with flash radially extruded outwardly. While welds made with these prior processes have been entirely satisfactory in most cases, they do not meet new and higher standards for increased load requirements particularly where large torques are to be transmitted. Furthermore, the extruded flash often had to be removed by special tooling and procedures during or after welding and this burdensome task substantially added to the cost of the welds.

With this invention there is a new and improved friction welding process in which the end and side faces of a rod or tube are frictionally welded to a plate member. Also in this invention special provision is made to control the flash causing it to be squeezed radially inwardly to eliminate the need for flash trimming or removal.

In the preferred embodiment of this friction welding process a generally cylindrical recess is formed in one metallic workpiece which has an internal diameter only slightly greater than the external diameter of another workpiece which may be a metallic tube or a solid metal rod with a flash receiving recess in the end thereof. The end portion of the tube or rod is clamped in a chuck which is part of a known flywheel mass. The flywheel mass is rotated to a predetermined rpm, the rotation mechanism disengaged and the rotating workpiece inserted in the cylindrical recess of the stationary workpiece with an axial load applied thereto. Initially, in a welding cycle, the end of the rod frictionally engages the flat bottom of the cylindrical recess to frictionally heat the material of the engaged interface so that it plasticizes with little or no initial extrusion or flash. As this is taking place, heat energy causes the tubular workpiece to expand relative to the confining walls defining the cylindrical recess. This expansion causes the side walls of the workpieces to engage at a cylindrical and second interface. On continued relative rotation of the second workpiece the second interface heats and plasticizes so that a continuous bond is formed which extends from the engaged end interface up around the sides of the two workpieces. The rotation of the second workpiece is stopped by the solidification of the weld; that is, the plasticized bond solidifies into what may be descriptively termed as an "around the corner friction weld." The engaged interface acts as a seal so that the flash is squeezed inwardly into the recess formed in the metal rod or into the end of the tube. With a curled ring of flash formed inside of the tubular workpiece, flash generally does not need to be removed; however, if desired a grinding tool may readily be inserted through the open end of the tube to the weld to mechanically grind and smooth the flash.

It is an object of this invention to provide a new and improved process of friction welding first and second workpieces at intersecting interface zones.

It is another object of this invention to provide a new and improved process for frictionally welding metallic workpieces together in which relatively rotating workpieces are frictionally engaged under a predetermined axial load at a substantially flat bottom interface and in which one of the workpieces radially expands relative to the other workpiece from the heat of friction as the bottom interface plasticizes into full frictional engagement with a cylindrical side wall of the other workpiece to form a second interface which plasticizes to thereby produce a continuous weld between the bottom and side interfaces on termination of the relative rotation of said workpieces.

It is another object of this invention to provide a new and improved friction welding process in which the side and the bottom portions of workpieces are frictionally engaged and welded and in which all flash is trapped in an internal space provided within the engaged workpieces.

These and other features, objects and advantages of the invention will become more apparent from the following detailed description and drawing in which.

Figure 1:
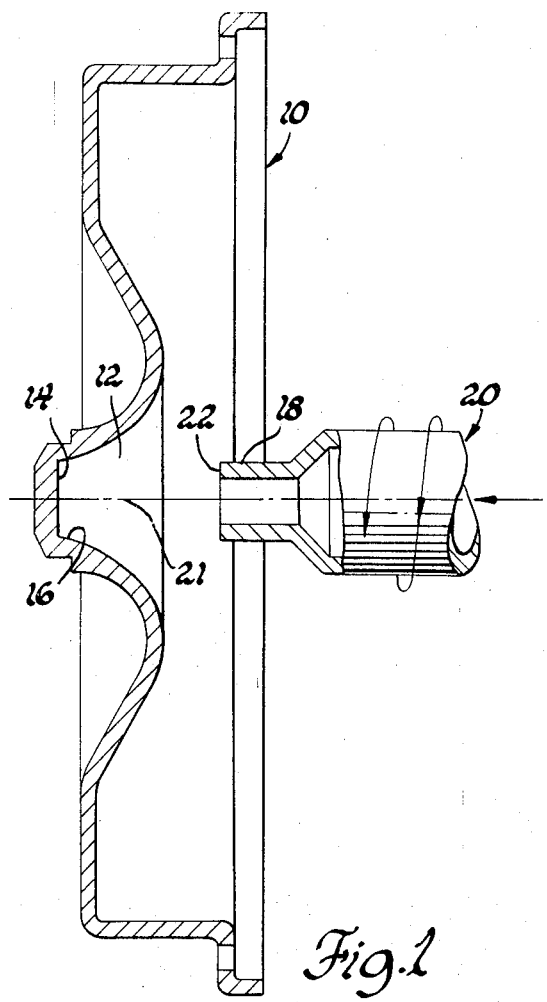
FIG. 1 is a side elevational view in cross-section showing workpieces to be welded together.
Figure 2:
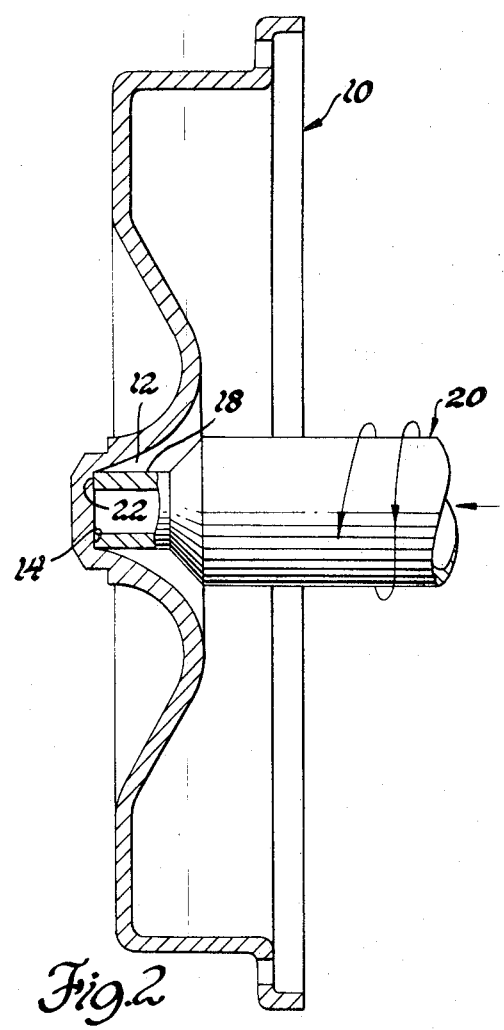
FIG. 2 is a view similar to FIG. 1, showing the workpieces brought together for frictional welding purposes.

Turning now to the drawings in greater detail, there is shown in FIG. 1 an annular steel plate 10 which is formed with a central cylindrical recess 12 having a flat end surface 14 surrounded by an annular wall 16. The recess 12 is dimensioned to closely receive the cylindrical end portion 18 of an elongated steel tube 20. The tube 20 preferably has a flat forward surface or contact face 22 for fully engaging the flat surface of recess 12 for friction welding purposes.

The plate and tube are adapted to be loaded in any suitable friction welding machine such as a welder with flywheel drive for rotating one workpiece while the other is held stationary and with motor means for effecting the engagement of the workpieces at an interface under any desired load.

Using such a friction welding machine the tube 20 is rotated about axis 21 to a predetermined speed sufficient for achieving a friction weld of these two parts. Then the machine is further activated so that the tube 20 is moved axially and so that the end portion 18 enters the recess 12 with the forward surface 22 of tube 20 frictionally engaging the flat surface 14 on the stationary workpiece 10. With the workpieces engaged under axial load the interface defined by these two surfaces rapidly heats and becomes plasticized. While this is taking place the end 18 of the workpiece 20 radially expands relative to the internal diameter of the opening 12 so that its side wall frictionally engages the cylindrical side 16 of the recess 12. The interface zone defined by these frictionally engaged side walls also rapidly heats to a plastic condition forming a bond that fuses with the plastic bond at the forward interface zone.

After the plasticized bond has been formed the relative rotation of the workpieces is stopped by the solidification of the weld, that is, the bond quickly solidifies to rigidly join the two workpieces together. The welder is then unloaded and new workpieces are loaded for a second welding operation.

Figure 3:
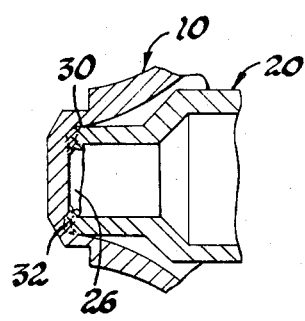
FIG. 3 is a view similar to FIG. 2 showing the two workpieces after being welded together by this friction welding process.

The upset pressure applied to the rotating workpiece during the weld cycle extrudes an annular ring of flash material 26 that is radially extruded inwardly from the tubular workpiece 20 as shown best in FIG. 3. There will be substantially no radial flash squeezed outwardly because of the sealing effect of the engaged sides of the workpiece. In FIG. 3, for example, the cylindrical edge 30 of the weld tapers; the contacting portions of the workpiece dispose outwardly the heat affected zone 32 providing a seal substantially preventing the radial extrusion of flash. Any flash which may be extruded radially outwardly is generally minor and usually can be ignored or readily removed by suitable tooling.

Figure 4:
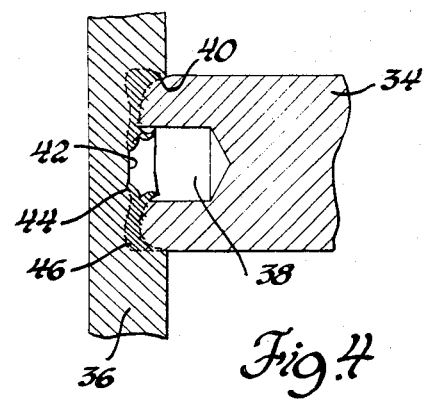
FIG. 4 is a cross-sectional view showing other types of workpieces being welded together utilizing the process according to this invention.

FIG. 4 discloses a modification of the process involving the welding of a solid cylindrical rod 34 and a flat metallic plate 36. As shown the rod 34 has a central counterbore 38 in one end thereof and the plate 36 has a cylindrical recess 40 milled therein with a flat bottom surface 42. The diameter of the recess 40 is slightly greater than the diameter of the rod. The welding procedure is substantially the same as with plate 10 and tube 20. The finished weld is shown in FIG. 4 with the flash 44 extending radially inwardly from the heat affected zone 46 into the bore 38. Again the bond is between the engaged bottom and side interfaces providing a second example of "around the corner" friction welding.

The preferred embodiment of this invention described and illustrated in this application can be modified to suit particular requirements. The scope and limitations of this invention are set forth in the following claims.

I claim:

1. A process for friction welding metallic first and second workpieces together comprising the steps of providing a cylindrical end on said first workpiece with an end opening surrounded by an annular end wall, forming a generally cylindrical pocket in said second workpiece with a substantially flat end face surrounded by a circular side wall, relatively rotating said workpieces, engaging said relatively rotating workpieces with a predetermined load to cause the workpieces to engage at an end interface so that the material of said workpieces at said interface will plasticize, allowing said first workpiece to radially expand and frictionally engage the cylindrical wall of said second workpiece at a second interface, continuing the relative rotation of said workpieces so that the material of said workpieces at said second interface plasticizes, further continuing said relative rotation until the plasticized material forms a continuous bond that encompasses said first and second interfaces and relatively rotating workpieces are frictionally engaged under a predetermined axial load at a substantially flat bottom interface and in which one of the workpieces radially expands relative to the other workpiece from the heat of friction as the bottom interface plasticizes into full frictional engagement with a cylindrical side wall of the other workpiece to form a second interface which plasticizes to thereby produce a continuous weld between the bottom and side interfaces on termination of the relative rotation of said workpieces.

2. A process for friction welding a first metallic workpiece having a longitudinally extending cylindrical wall and a laterally extending end surface to a second metallic workpiece comprising the steps of forming a recess in a central portion of said second workpiece with a laterally extending bottom surface for engaging said end surface of said first workpiece and with an annular side wall of a diameter slightly greater than the diameter of said cylindrical wall of said first workpiece, rotating said first workpiece relative to said second workpiece to a predetermined speed, moving one of said workpieces axially relative to the other of said workpieces to engage said relatively rotating workpieces under load at a first interface formed by said laterally extending end surface of said first workpiece and said bottom surface of said second workpiece so that said workpieces frictionally heat and plasticize at said first interface, continuing said rotation of said first workpiece so that relative expansion of said workpiece causes a portion of said cylindrical wall of said first workpiece to frictionally engage the annular side wall of said recess of said second workpiece at a second interface and cause said second interface to frictionally heat and plasticize and coact with said plasticized first interface to form a continuous bond that encompasses said first and second interfaces and allowing said continuous bond to solidify to thereby rigidly connect said workpieces on termination of the relative rotation thereof.

3. A process for friction welding a first metallic workpiece having a longitudinally extending cylindrical portion and a flat contact face to a second metallic workpiece comprising the steps of forming a recess in said second workpiece with a flat end surface for engaging said contact face of said first workpiece and with an annular side wall having a diameter slightly greater than the diameter of the cylindrical portion of said first workpiece, providing a longitudinally extending passage extending through the contact face of said first workpiece, relatively rotating said workpieces to a speed sufficient to cause the workpieces to frictionally heat to a welding temperature when engaged under a predetermined load, applying a load to engage said workpieces at a first interface comprising said contact face and said end surface so that the material of said relatively rotating workpieces plasticizes in a first zone, continuing said relative rotation until the differential expansion of said workpieces causes the cylindrical portion to contact the annular side wall of said recess at a second interface so that the material of said workpieces plasticizes in a second zone, stopping the relative rotation of said workpieces so that the bond formed by the plasticized material of said workpieces includes both of said zones and so that substantially all weld flash produced during welding is squeezed by the load into said longitudinally extending passage in said first workpiece.

4. A process for frictionally welding first and second metallic workpieces together comprising the steps of forming a cylindrical recess in said second workpiece with a flat annular bottom and an annular side wall, providing a first workpiece with a longitudinally extending cylindrical part which has a diameter slightly less than the diameter of said cylindrical recess and with a transversely extending contact face at the end thereof, providing an opening in said first workpiece which opens out of said contact face, relatively rotating said workpieces to a speed sufficient to allow their frictional welding, engaging said relatively rotating workpieces under load with an end portion of said cylindrical part of said first workpiece disposed within the cylindrical recess formed in said second workpiece so that the contact face of said first workpiece engages the bottom of said cylindrical recess at a first interface, applying sufficient load to cause said relatively rotating workpieces to frictionally heat and plasticize in a zone including the engaged interface, continuing said relative rotation so that the end portion of said first workpiece radially expands relative to said second workpiece and directly contacts the annular side wall thereof to provide a second interface that is heated by friction and plasticizes in a second zone, continuing said relative rotation of said workpieces so that a continuous bond is formed that includes both of said interfaces and so that substantially all weld flash is extruded radially inwardly into said opening as said relative rotation terminates and said bond hardens to rigidly join said workpieces together.

* * * * *

PO-1050
(5/69)

UNITED STATES PATENT OFFICE
CERTIFICATE OF CORRECTION

Patent No. __3,777,360__          Dated __December 11, 1973__

Inventor(s) __Eugene E. Welch__

It is certified that error appears in the above-identified patent and that said Letters Patent are hereby corrected as shown below:

Columns 1 and 2: the paragraph beginning with line 65 of column 1 through line 10 of column 2 should be inserted in column 2, between lines 16 and 17.

Column 3, claim 1, lines 52 through 62, delete "relatively rotating workpieces are...relative rotation of said workpieces" and insert therefor -- allowing said second interface to form a seal so that weld flash produced during welding is extruded radially inwardly and into the end opening in said first workpiece --.

Signed and sealed this 6th day of August 1974.

(SEAL)
Attest:

McCOY M. GIBSON, JR.
Attesting Officer

C. MARSHALL DANN
Commissioner of Patents